Sept. 24, 1957     F. W. FENNING ET AL     2,807,580
THERMAL NUCLEAR REACTOR

Filed March 14, 1952     16 Sheets-Sheet 1

FREDERICK WILLIAM FENNING,
ROBERT FLINDERS JACKSON,
Inventors

By Robert B. (signature)

Attorney

Sept. 24, 1957     F. W. FENNING ET AL     2,807,580
THERMAL NUCLEAR REACTOR
Filed March 14, 1952     16 Sheets-Sheet 2
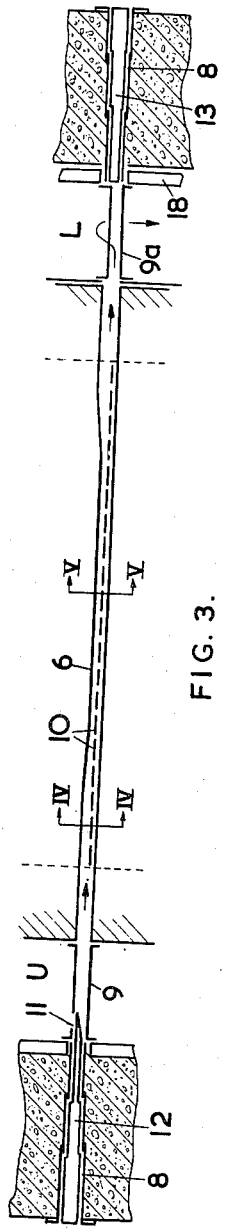
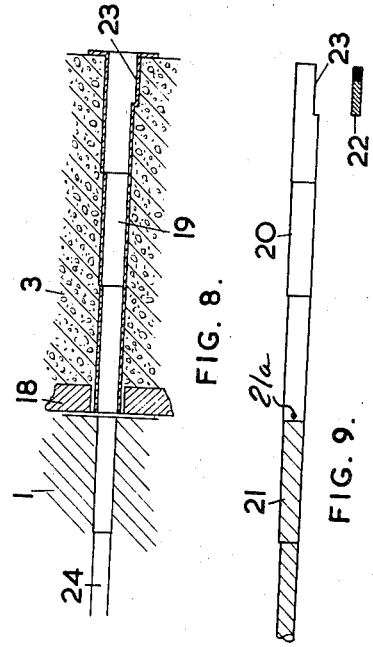
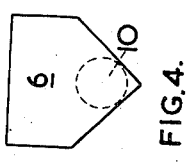
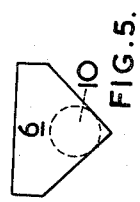
FREDERICK WILLIAM FENNING,
ROBERT FLINDERS JACKSON,
Inventor
By
Attorney Sept. 24, 1957　　　F. W. FENNING ET AL　　　2,807,580
THERMAL NUCLEAR REACTOR
Filed March 14, 1952　　　　　　　　　　　　16 Sheets-Sheet 3

FREDERICK WILLIAM FENNING,
ROBERT FLINDERS JACKSON,
　　　　　　　　　　Inventors

Sept. 24, 1957     F. W. FENNING ET AL     2,807,580
THERMAL NUCLEAR REACTOR
Filed March 14, 1952     16 Sheets-Sheet 4
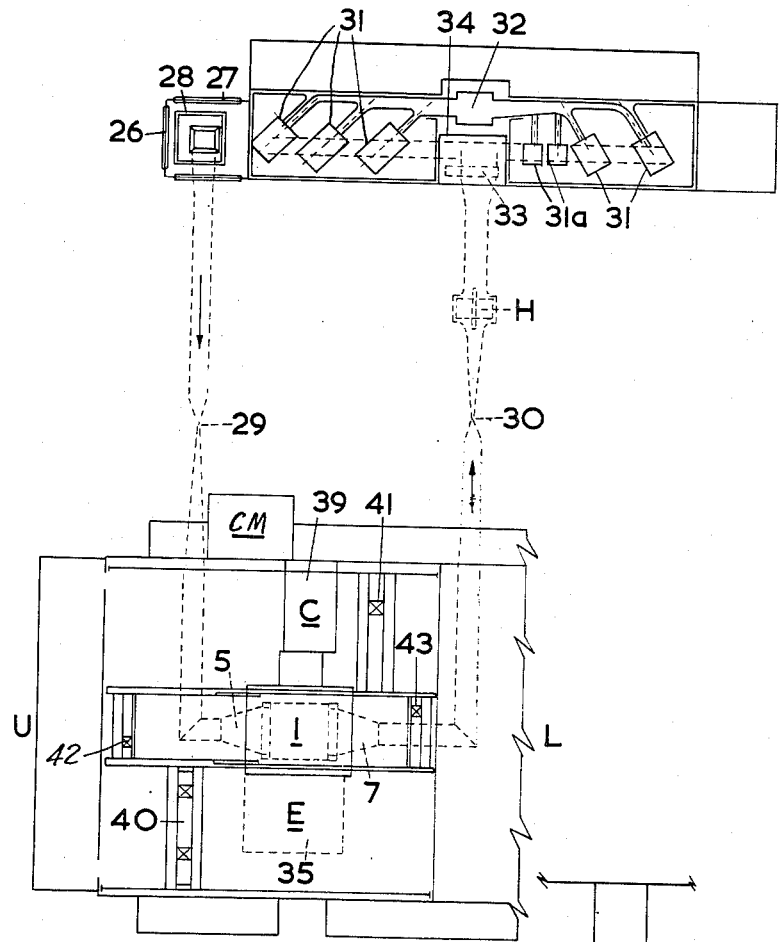
FIG. 10.
FIG. 11.
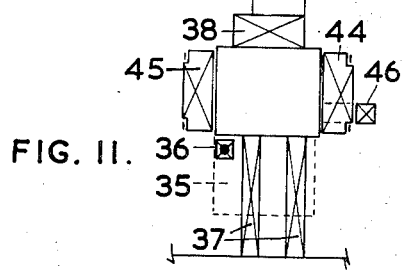
FREDERICK WILLIAM FENNING,
ROBERT FLINDERS JACKSON,
Inventors
By
Attorney Sept. 24, 1957     F. W. FENNING ET AL     2,807,580
THERMAL NUCLEAR REACTOR
Filed March 14, 1952     16 Sheets-Sheet 6
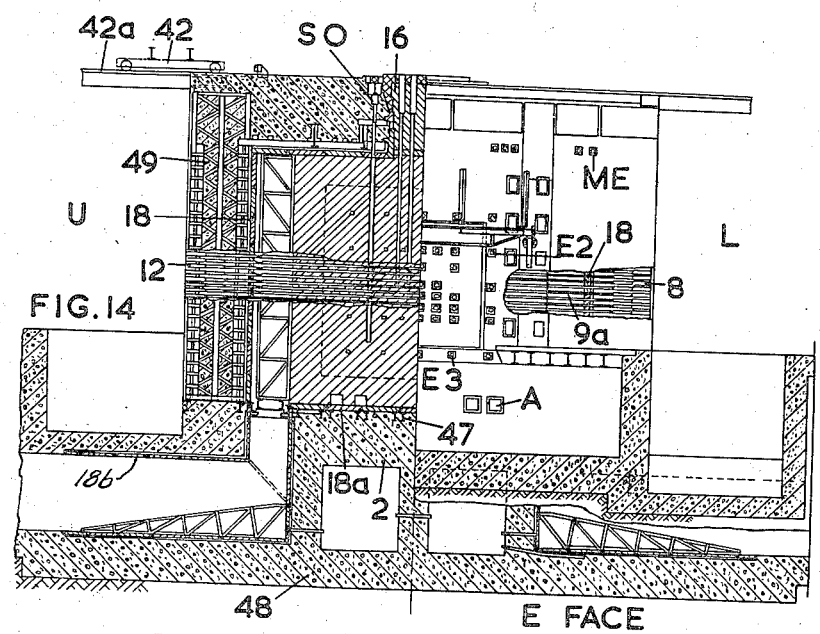
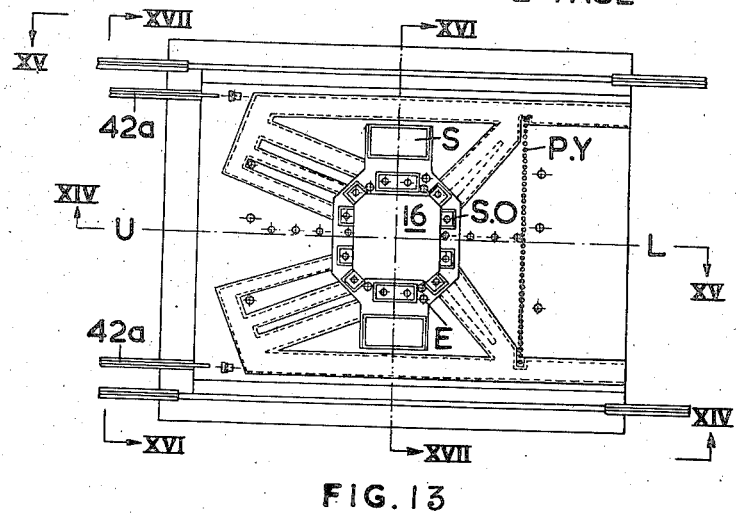
FIG. 13
FREDERICK WILLIAM FENNING,
ROBERT FLINDERS JACKSON,
Inventors
By
Attorney Sept. 24, 1957  F. W. FENNING ET AL  2,807,580
THERMAL NUCLEAR REACTOR
Filed March 14, 1952  16 Sheets-Sheet 8

UNLOAD FACE

FREDERICK WILLIAM FENNING,
ROBERT FLINDERS JACKSON,
Inventors

By

Attorney

| EXPERIMENTAL FACE | | HOLES IN GRAPHITE | | | |
|---|---|---|---|---|---|
| CODE LETTER | SYMBOL | DESCRIPTION OF HOLE | NO OF | CROSS SECTION | LENGTH FROM GRAPHITE EXPERIMENTAL FACE |
| E.1 | ■ | EXPERIMENTAL | 12 | ⎫ | THRO' TO CONTROL FACE |
| E.2 | ◪ | " | 11 | ⎬ | THRO' TO CONTROL FACE |
| E.3 | ⊡ | " | 5 | $3\frac{7}{8}" \times 3\frac{7}{8}"$ | 13' 10½" APPROX TO CENTRE LINE |
| E.4 | □ | " | 5 | | 12' APPROX TO CENTRE LINE |
| E.5 | ⊠ | " | 9 | | 3' 7¼" ⎱ TO EDGE OF |
| E.6 | ⊠ | " | 2 | ⎭ | 3' 7¼" ⎰ REACTING CORE |
| A.1 | Ⓐ | LARGE ANIMAL | 4 | 14½"×14½" | THRO' TO CONTROL FACE |
| C | ◆ | CONTROL ROD | 5 | | THESE HOLES NOT RIGHT THROUGH BUT ARE CUT IN CORES 7¼" SQ WHICH ARE REMOVABLE FROM EXPERIMENTAL FACE |
| OTHER HOLES | | | | | |
| CODE LETTER | SYMBOL | DESCRIPTION OF HOLE | NO OF | REMARKS | |
| ME | ⊞ | MORTUARY | 10 | THROUGH TO CONTROL FACE TO SUIT PLUGS AND STRINGERS FROM EXPERIMENTAL HOLES E.1 - E.6 | |

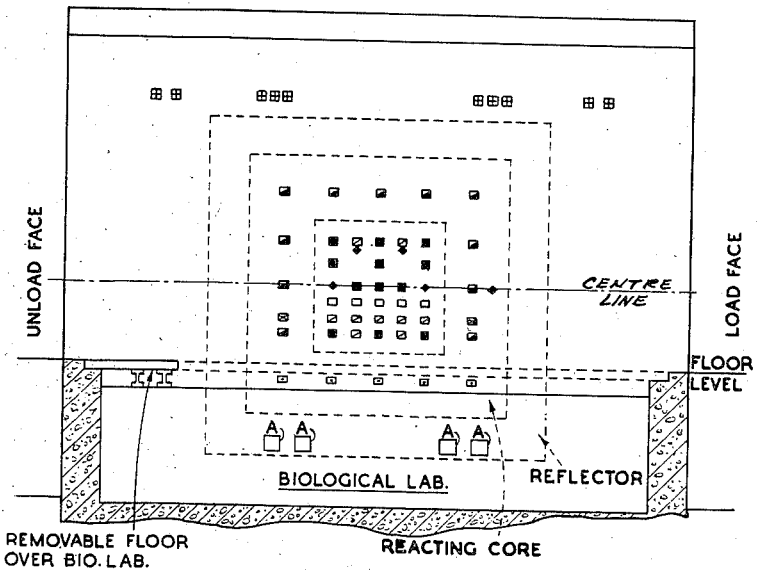

FIG. 18

FREDERICK WILLIAM FENNING,
ROBERT FLINDERS JACKSON,
Inventors

By
Attorney

| CONTROL FACE HOLES IN GRAPHITE | | | | | |
|---|---|---|---|---|---|
| CODE LETTER | SYMBOL | DESCRIPTION OF HOLE | N° OF | CROSS SECTION | LENGTH FROM GRAPHITE EXPERIMENTAL FACE |
| E1 | ■ | EXPERIMENTAL | 12 | 3⅞" X 3⅞" | THRO' FROM EXPERIMENTAL FACE |
| E2 | ◪ | | 11 | | |
| A1 | Ⓐ | LARGE ANIMAL | 4 | 14½" X 14½" | THRO' FROM EXPERIMENTAL FACE |
| A2 | Ⓐ | | 2 | | 3' (TO REACTING CORE) |
| A3 | ⓐ | SMALL ANIMAL | 1 | 7¼"X7¼" | 3' (TO REACTING CORE) |
| IC1 | ① | ION CHAMBER | 4 | 8" | 4'2½" (TO REACTING CODE) |
| IC2 | ② | | 5 | | 5'5½" (TO REACTING CODE) |
| C1-C5 | ◆ | CONTROL ROD | 5 | | 25'11¼" (7¼"X7¼" CORE REMOVABLE FROM EXPERIMENTAL FACE) |

MORTUARY HOLES - SEE EXPERIMENTAL FACE

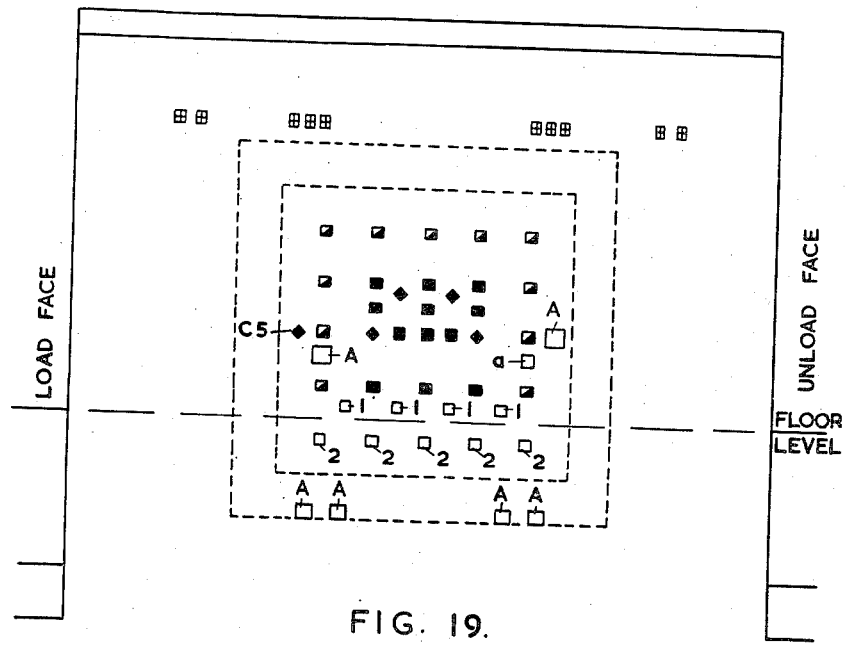

FIG. 19.

Sept. 24, 1957  F. W. FENNING ET AL  2,807,580
THERMAL NUCLEAR REACTOR
Filed March 14, 1952  16 Sheets-Sheet 12

| TOP FACE HOLES IN GRAPHITE | | | | | |
|---|---|---|---|---|---|
| CODE LETTER | SYMBOL | DESCRIPTION OF HOLE | N⁰ OF | CROSS SECTION IN GRAPHITE | DEPTH FROM TOP GRAPHITE FACE |
| TE | ⊙ | THERMAL EXP$^{TL}$ | 16 | 4" DIA. | 13' 3" |
| E | ○ | EXPERIMENTAL | 6 | 4" DIA. | 13' 3" |
| S | ▭ | SACK HOLES | 2 | 29" X 65¼" | 29" |
| SO | ● | SHUT OFF ROD | 12 | 4" DIA. | 19' 3½" |

| OTHER HOLES | | | | | |
|---|---|---|---|---|---|
| CODE LETTER | SYMBOL | DESCRIPTION OF HOLE | N⁰ OFF | REMARKS | |
| P | + | PERISCOPE | 6 | MIN DIA 4½" | STEPPED HOLES |
| PY | • | PYROMETER | 43 | MIN DIA 1½" | THROUGH SHIELD |
| M | × | GRAPHITE MEASURING | 8 | MIN DIA 1½" | ONLY WITH PLUGS |

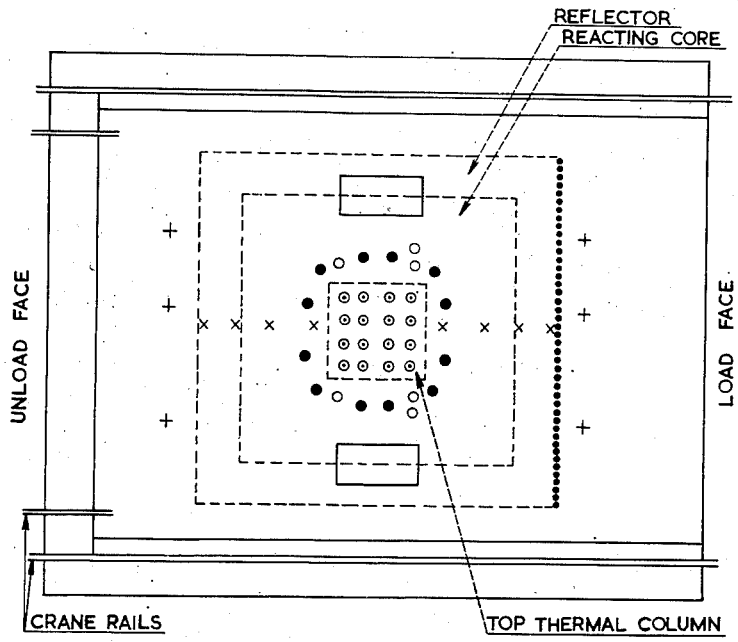

FIG. 21.

FREDERICK WILLIAM FENNING,
ROBERT FLINDERS JACKSON,
  Inventors
By Robert B. ?????
  Attorney Sept. 24, 1957
F. W. FENNING ET AL
2,807,580
THERMAL NUCLEAR REACTOR
Filed March 14, 1952
16 Sheets-Sheet 15
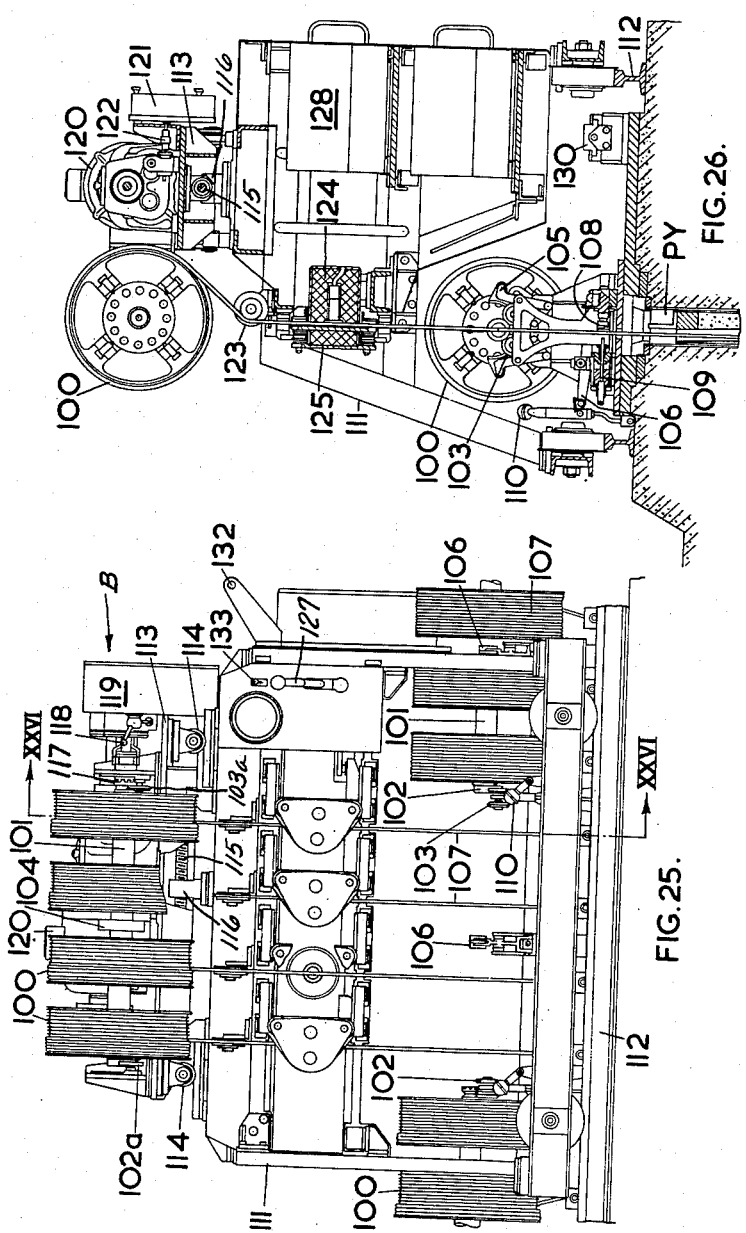
FREDERICK WILLIAM FENNING,
ROBERT FLINDERS JACKSON,
Inventors
By
Attorney

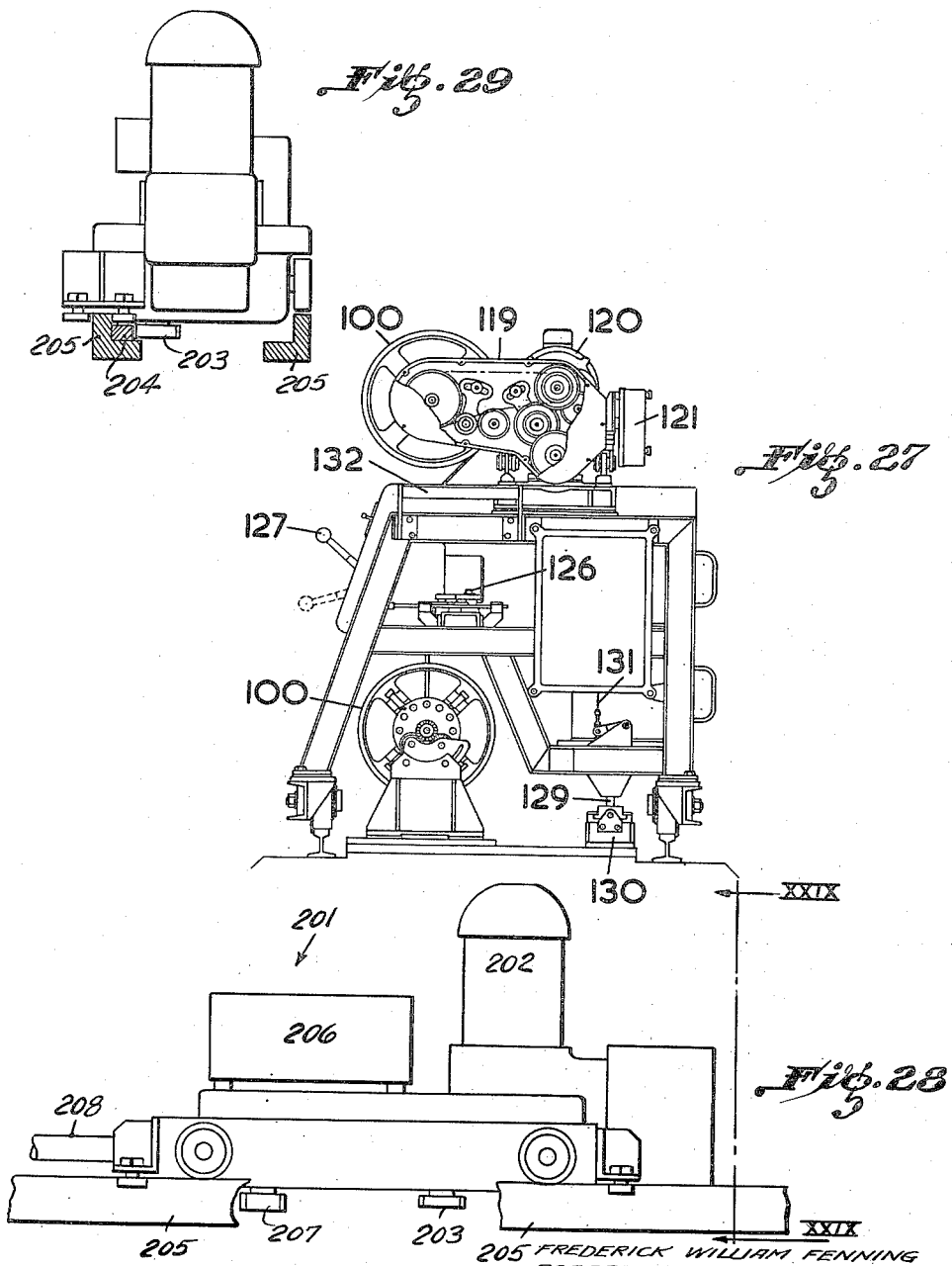

«U»nited States Patent Office 2,807,580
Patented Sept. 24, 1957

2,807,580
THERMAL NUCLEAR REACTOR

Frederick William Fenning and Robert Flinders Jackson, Strand, London, England, assignors, by mesne assignments, to the United States of America as represented by the United States Atomic Energy Commission Application March 14, 1952, Serial No. 276,604

1 Claim. (Cl. 204—193.2)

This invention relates to nuclear reactors of the graphite moderated air cooled type in which canned slugs or rods of fissile material are employed and is concerned inter alia with means associated with such piles for producing radioactive isotopes and useful heat under conditions of maximum safety.

To ensure such conditions it is necessary to control the level of radiation of all types over the working area round the pile and even over the environs of the establishment.

Fast and thermal neutron monitors and gamma radiation meters may be installed in known manner around the pile and working area, and connected to indicators and alarms in a control room.

Monitors may also be installed in the exhaust duct to check the activity of the effluent air. There is an unavoidable and appreciable activity during normal operation but it might be considerably increased if say the sheath of a cartridge failed and permitted fission products to be carried off by the air stream. The detection of a single burst cartridge, however, is difficult because of the high background activity and regular checks of the activity at the exit of each cartridge filled channel is desirable.

One particular feature of a nuclear reactor constructed in accordance with the present invention is the means provided for detecting the individual channel in which a fault condition has occurred.

Other features of the invention will be apparent from the following detailed description of a complete nuclear reactor embodying the invention.

In the drawings:

Fig. 3 is an enlarged sectional view of the uranium channel in Fig. 1.

Fig. 4 is a section on the line IV—IV of Fig. 3.

Fig. 5 is a section on the line V—V of Fig. 3.

Fig. 8 is a sectional view through a typical experimental hole in the experimental face E.

Fig. 9 illustrates a plug used to close the hole shown in Fig. 8.

Fig. 10 is a block plan of the reactor showing the cooling system and handling gear.

Fig. 11 is a plan view of part of Fig. 10 showing further handling gear.

Fig. 13 is a plan view of the reactor.

Fig. 14 is a section on the line XIV—XIV of Fig. 13 (experimental face).

Fig. 18 is a diagram of the experimental face.

Fig. 19 is a diagram of the control face.

Fig. 21 is a diagram of the top face.

Fig. 25 is a front elevation of one of the winding trolleys shown in Fig. 24.

Fig. 26 is a section on the line XXVI—XXVI of Fig. 25.

Fig. 27 is a side elevation of Fig. 25 in the direction of arrow B.

Fig. 28 is a side elevation of one of the control rod driving mechanisms, and

Fig. 29 is a section on the line XXIX—XXIX of Fig. 28.

Figure 1:
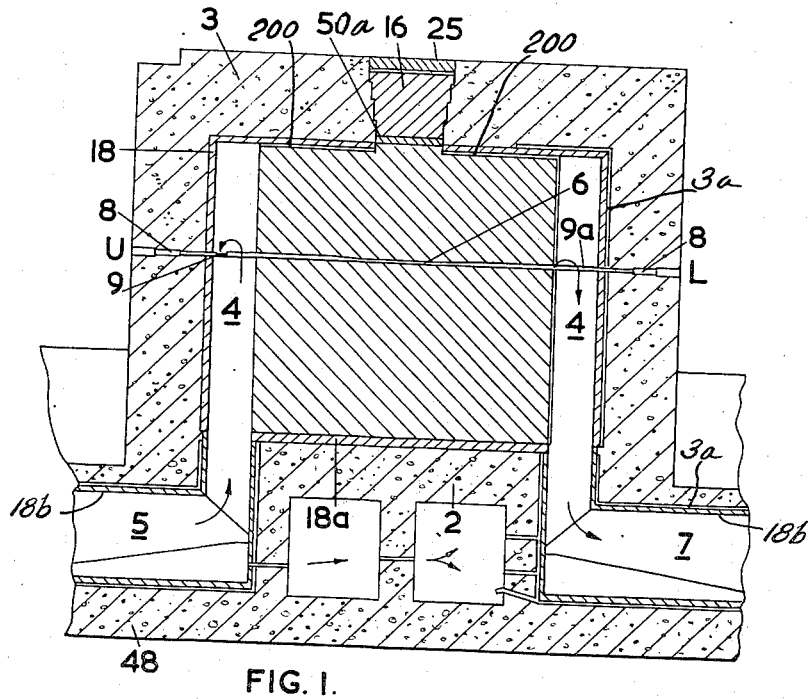
Fig. 1 is a diagrammatic vertical section of the reactor taken through a uranium channel.
Figure 2:
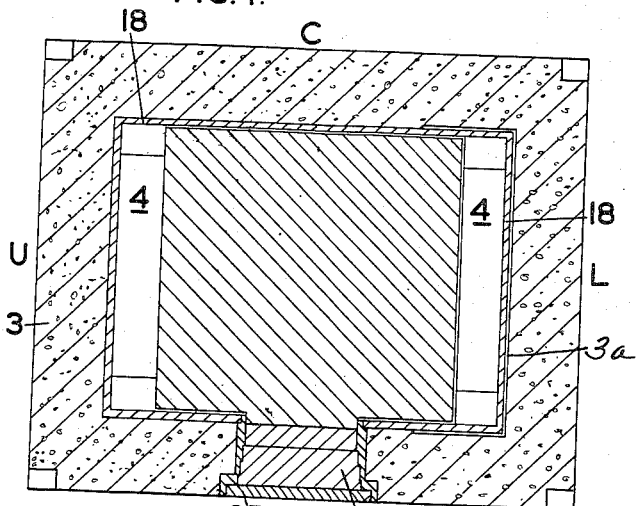
Fig. 2 is a diagrammatic sectional plan.

Referring to Figs. 1 and 2, the reactor comprises a 26 ft. cube 1 of graphite supported on a concrete base 2 and enclosed within a massive concrete shield 3. The four vertical faces of the cube are designated load L, unload U, charge C and experimental E as indicated in Fig. 2.

Control of the pile is exercised by control rods of high neutron capturing material which may be moved in and out of the pile. "Shut off" rods of a similar material are arranged to drop into the centre of the pile automatically and stop the reaction in the event of any of several factors reaching a dangerous level. These rods are not shown in Figs. 1 and 2 but will be described hereinafter.

At the load and unload faces L and U spaces 4 are provided to contribute headers for cooling air which enters through a subterranean inlet duct 5 passes through a larger number of channels 6 (a typical one only is shown in Fig. 1) in the graphite mass and discharges through the outlet duct 7.

The typical channel 6 is seen to be aligned with stepped holes 8 in the shield 3 and steel tubes 9 bridge the header 4 at the unload end to provide a channel along which uranium cartridges may be pushed from the exterior of the shield 3. At the load end V-section troughs 9a bridge the header 4.

Fig. 3 shows a typical uranium channel 6 to an enlarged scale with uranium cartridges 10 in position and Figs. 4 and 5 show the shape of the channel in cross section. The channel 6 is of reduced cross-section along its central portion to increase the air velocity and hence the heat transfer coefficient over those uranium cartridges 10 in the hot central region.

The uranium metal is in the form of machined rods 0.900 inch diameter x 12 inches long. These rods are encased in aluminium cans of wall thickness 0.025–0.030 inch obtained by a deep drawing process. The open end of the can is closed by an aluminium disc rolled in with top of the can and brazed with a silicon-aluminium solder.

The cans are tested by subjecting to hot air at 300° C. for several hours and then to steam pressure, when any leak would allow water to enter the can where, at the temperature prevailing, it would form uranium oxide which is a power of greater volume than the uranium that it contains. Thus at any point where it is formed the aluminium case is deformed and a "blister" appears. This can be rejected.

The uranium metal must be almost free from impurity and the competitive absorption of neutrons should not exceed about 0.25. The average density is 19 gms./cc. and M. P. 1100° C. The first allotropic change on heating is at 650° C. when the volume increases by 0.3%, thus the slug centre temperature must not exceed this amount or splitting might occur. The aluminium sheath must also be of high purity. The melting point of aluminium is 660° C. The maximum aluminium sheath temperature has been set at 250° C.

Cooling air is admitted to each channel 6 through a slot 11 in the bridge tube 9 at the unload face and this slot is closable by the tapered end of a plug 12 which closes the hole 8. Thus adjustment of the air flow in any channel is effected by rotation of the plug 12.

The V-shaped troughs allow air to discharge freely into the outlet header 4 and the load hole 8 is closed by a plug 13.

Figure 6:
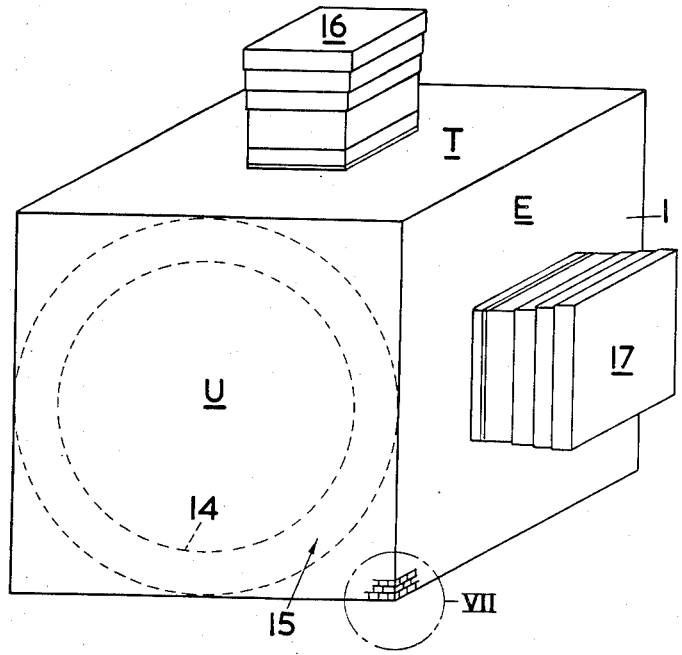
Fig. 6 is a perspective view of the graphite mass.

The graphite mass 1 is shown diagrammatically in perspective in Fig. 6.

The reacting core of this mass may be regarded as a cylinder 14 about 20 ft. in diameter and 20 ft. long surrounded on all sides by a neutron reflecting region 15 about 3 ft. thick with additional masses at the corners to complete the cube. Cooling channels 6a (Fig. 16) similar to the channels 6 are provided in the reflecting region, the channels 6a being of the smaller section shown in Fig. 5 throughout their length.

Figure 7:
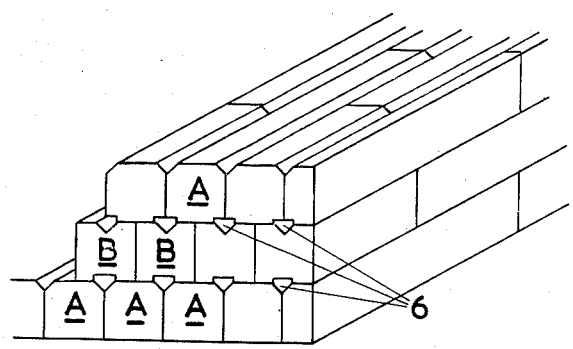
Fig. 7 is an enlarged view of the part of Fig. 6 in the circle VII.

From this project the top and side "thermal" columns 16 and 17 respectively. The graphite is penetrated from load to unload face by approx. 1760 of channels 6 arranged in a square lattice of side 7¼ inches. The length 7¼ inches or one "pitch" (IP) is a basic measurement in the construction of the graphite and the basic graphite block from which the mass is built is 7¼ x 7¼ x 29 inches, i. e. 1 x 1 x 4 pitches. This gives rise to the construction shown in Fig. 7, where the channels 6 are seen to be formed by blocks type A (odd layers) and blocks type B (even layers). In order to form the many holes and removable cores which as will be hereinafter described, traverse the pile from top, experimental and control faces, variations on the basic types are required. The cooling channels 6 are not interrupted by any holes traversing the pile from other directions. In order that holes in the graphite 1 may line up with holes through the shielding 3 with the greatest possible accuracy, machining tolerances of ±0.0025 inch are necessary on all leading dimensions on the graphite blocks.

The function of the graphite is to slow down neutrons. Absorption of neutrons is, however, undesirable and accordingly a graphite of high density and high purity is required. One part per million by weight of boron and even less of some rare earth elements is unacceptably large. One part per thousand of water is a serious impurity.

High density, high purity and good mechanical properties are to some extent conflicting requirements for commercial graphite and a balance has been struck using material of density about 1.64, effective absorption cross section per atom of 4.9 millibarns (one barn=$10^{-24}$ sq. cm.) and an ultimate tensile strength of 0.5 ton per sq. inch).

The shielding round the pile 1 and outlet air duct 7 is designed to reduce the neutron and gamma activity in the pile building to a figure negligible compared to the tolerance level for an 8 hour shift. This ensures that a very low background is observed on counting equipment used in the building for experimental purposes.

Within the concrete shield 3 on all sides is a "thermal" shield 18 of interlocking cast iron plates 6" thick, which are hung from a steel framework cast in with the outer concrete (biological) shield 3. This thermal shield 18 by virtue of its high capture cross section for thermal neutrons and high density, absorbs most of the thermal neutron and gamma flux incident upon it. Thus most of the total heat released in the shielding (4 kw. at full power) occurs in the thermal shield 18 where the heat is readily transferred to the cooling air. The neutron and gamma fluxes leaving the thermal shield 18 are reduced by a large factor but are still high by biological standards. The "biological" shield 3 of approximately 6½ feet of "barytes" concrete serves to slow down fast neutrons, capture the thermal neutrons produced and absorbs the gamma rays arising from this neutron capture as well as absorbing any of the two latter which escape from the thermal shield 18.

The thermal and bioshields give protection from core radiation but there are many load, unload and experimental holes passing through the shielding all of which must also be made proof against the escape of radiation. As shown in Figs. 8 and 9 stepped tubes 19 of stainless steel are cast in with the concrete shield 3 to line one such hole 24 and into this tube fits a correspondingly stepped mild steel plug 20 filled with concrete. There are two steps, each of ³⁄₁₆ inch to ⅜ inch according to the size of the plug, while the clearance between the plug and the tube varies from ⅛₆ to ³⁄₁₆ inch. Thus an annular neutron and gamma beam escaping down the clearance space meets an obstruction at each step and is scattered. The horizontal (square section) experimental holes have a continuous bottom surface (see Fig. 9) to enable the graphite stringer 21 to be easily inserted and withdrawn. The stringer 21 fits into a recess in the end of the plug 20 and is secured by a mild steel dowel 21a. To effect a seal on this lower surface a key 22 consisting of 9 inches of paraffin wax and 3 inches of steel is inserted into the space formed by recessing at 23 the lower surface of both plug and hole over a length of 12 inches.

The thermal columns 16 and 17 have lead filled mild steel doors 25 approximately 12 inches thick, these may be removed in sections. Where experimental holes pass through the doors lead filled mild steel stepped plugs are provided as shown in Figs. 8 and 9.

The general arrangement of the cooling system is shown in plan in Fig. 10. Cooling air is drawn into a building 26 through louvres 27 and through filter 28 along an inlet venturi 29, thence through the pile to an outlet venturie 30 and to the exhaust fans 31. The exhausters 31 discharge up a 200 feet stack, the base of which is indicated at 32. In this manner the whole pile structure is kept under suction and any leak is fresh air inwards and not possibly activated air outwards.

There are 5 main exhausters 31 each driven by a 1400 H. P. induction motor (not shown). Each exhauster has a capacity of 66,000 C. F. M. air at 80° C. with a pressure rise of 2.6 p. s. i. discharging to atmosphere. Only 4 of these exhausters are required to operate the pile at 6000 kw., when the discharge will be 264,000 C. F. M. at 80° C. (i. e. 180,000 C. F. M. at 20° C. at air intake at 60° C. tem. rise across the pile). There are in addition two auxiliary exhausters 31a each driven by a 7½ H. P. induction motor. Each has a capacity of 15,000 C. F. M. air at 100° C. with a pressure rise of 1½ inch water discharging to atmosphere. These auxiliary exhausters 31a are provided:

(a) For cooling and ventilating the pile during shut down periods.

(b) For cooling immediately following a main power failure when they obtain electrical supply from batteries or a diesel generator located at 34.

(c) For operating the pile at low power levels. When the auxiliary exhausters are both running the pile will operate without the main exhausters at 900 kw. with a temperature rise of 60° C. across the pile.

For the production of useful heat a gilled tube type of heat exchanger H is included in the outlet duct. The duct is enlarged as shown in Fig. 10 to accommodate the exchanger H which is in two sections on either side of a central dividing wall. Butterfly valves below each section of the heat exchanger can be opened so as to by-pass the exchanger sections to a varying degree.

Dust and other airborne particles carried in the air stream are irradiated in the passage through the pile and may become active, and are later carried away by the stack exhaust and possibly deposited over the countryside. The most serious are the heavier particles which might be deposited fairly soon after exhaust and might build up an appreciable concentration on the ground and buildings in the vicinity of the site. Such heavy particles are not normally airborne initially and so are seldom carried into the cooling stream. Precautions are therefore taken to ensure that local conditions do not give rise to dust in the immediate neighbourhood of the intake.

Dust particles may cause erosion within the pile, particularly of the relatively soft graphite. Besides the resultant mechanical deterioration, erosion increases the dust content of the exhaust gases but the eroded matter will be mainly graphite dust which does not carry a high specific activity.

Deposition of dust within the pile is not serious because the air velocities and turbulence are much higher than in the ambient air. There may be a certain amount of impact deposition, an accumulation of which could cause a deterioration of the pile.

Water vapour is an undesirable component in the cooling air because it is a serious absorber of neutrons and an accelerator of corrosion. The amount normally present is not sufficient to cause trouble; it will not accumulate in the pile because the temperatures therein are above ambient.

As an additional margin of safety against contamination of the environs of the site, particularly important in the event of a burst or damaged cartridge which would allow very active material to be carried off by the air stream, an outlet filter 33 is provided just before the main fan header below the battery room 34.

This filter removes all particles of 10 microns or greater, lighter particles being almost continuously air-borne.

The inlet filter 28 comprises a standard commercial type filter incorporating throw-away cotton wool pads. It consists of 204 sections, 2'6" x 2'3", each containing 10 pads. The frontal area is about 1100 sq. ft.; the pads are V-shaped and the effective area is therefore some 10 times greater. The air velocity through the filter is about 0.25 F. P. S. With such a large filter area the pressure drop is quite small; for an air flow of 200,000 C. F. M. the initial drop is less than 0.1 in. water gauge rising to 0.375 in. water gauge during operation, at which point the filter pads are replaced. The pads never become active and their disposal involves no hazard.

The space available for the outlet filter 33 is restricted to a frontal area of 262 sq. ft. This filter accumulates active dust, so it is convenient to have duplicate parallel units in one of which the active material can be left to decay before disposal while the other is in use. Cotton wool pads are used for the filter elements with the usual V-construction. The total effective area for each filter is about 1600 sq. ft. and the air velocity through the filter is nearly 2 F. P. S. Consequently the pressure drop is higher than for the inlet filter, ranging from 1 in. w. g. initially to 5 ins. w. g. before disposal and they require to be renewed more frequently.

The accumulated dust can be handled without undue hazard by leaving it on the filter for about one week for the activity to decay. The pads can then be removed and, if found economic, can be cleaned and re-used by a reverse air-flow and agitation. The dust can be collected by a vacuum cleaner with a fine filter and handled as mildly active waste.

The pressure drop through the main cooling channels of the pile is so considerable that no very special attempts to minimise duct losses are necessary. The ducts are rectangular with an average cross-section of 80 sq. ft. which for a flow of 180,000 C. F. M. gives an air velocity of about 35 F. P. S. The corresponding pressure drop over a total duct length 600 ft., including venturis and headers is estimated at 0.1 p. s. i., representing only a few percent of the total drop of 2.6 p. s. i.

The duct is of normal reinforced concrete construction, waterproofed with a layer of bitumastic. On the inlet side no special considerations arise except near the entrance to the main pile structure where its walls may be subjected to some gamma and neutron bombardment. To reduce the heat generated in the concrete in this area, the thermal shield 18 of the main pile is decreased to 3" thick and extended back into the duct for a distance of 23' from the pile face as indicated at 18b in Figs. 1 and 14 to 17.

On the outlet side, more difficult conditions are encountered. The air temperature on leaving the pile is 80 to 100° C. an has appreciable gamma activity due to the argon content and possibly to activated dust particles. In addition there is some neutron activity close to the pile outlet.

The thermal shield 18 is again extended into the duct for a distance of 23' at the reduced thickness of 3" as also indicated by the reference 18b in Figs. 1 and 4 to 17 and from there a ½" sheet steel lining is provided right up to the fanhouse.

Some air (from the building) is drawn in behind the plates of the shield for cooling purposes.

The handling and other facilities are shown in Figs. 10 and 11. Below floor level at the experimental face E is a biological laboratory 35 served through a hole in the floor by 1½ ton hoist 36.

Several experimental holes are accessible from this laboratory as will be described hereinafter. Also at the experimental face E are two ten ton platforms 37 (Fig. 11) spanning the space between the face E and the wall of the building housing the reactor and moveable vertically and horizontally by means of overhead cranes to any position on the face. One ten ton removable platform 38 is provided at the control face above the level of the control rod and ion chamber gear 39 (Fig. 10) described hereinafter. Ten ton overhead travelling cranes 40 and 41 serve the experimental and control faces respectively over the whole length of the building and a ten ton crane 42 serves the unload face. The cranes 40—42 operate at the level of the top of the reactor. A five ton crane 43 serves the top face and load end at high level. Twelve ton hoists 44 and 45 also serve the load and unload faces respectively and a half ton hoist 46 serves the top face.

Reference is now directed to the perspective view of the reactor (Fig. 12) and to the subsequent elevations, sections and face diagrams (Figs. 13 to 21).

The weight to be carried by the base 2 (Figs. 14–17) is not very considerable. The weight of the graphite 1 is about 800 tons and the total for the pile including bridge tubes 9 (Fig. 15) lower thermal shield 18a etc. is of the order of 1000 tons. Spread over 26 ft. square, the loading is only about 2 tons per sq. ft.

Mild steel girders 47 are set in the upper surface of the base 2 which rises from the main apron 48. The base is hollow for economy reasons and is vented mainly to prevent the possibility of accumulation of dangerous fission products and also to remove the small amount of heat generated and conducted into the concrete. On the girders 47 are laid the 6" cast iron plates of the lower thermal shield 18a which are carefully leveled to act as the main floor on which the graphite is laid.

The main apron 48 carries the base 2 together with the shielding structure, hoist foundations, etc. The loading is again fairly light amounting to about 10,000 tons over an area 60' x 80' giving a pressure of 2½ tons per sq. ft. These figures are quite conservative for the type of chalk subsoil existing at the site. The load is roughly balanced on the apron to avoid the possibility of tilting as the foundations settle.

The principal function of the thermal shield 18 is to reduce the γ-ray intensity from the pile as quickly as possible and to dissipate the heat thus generated; a dense material of good conductivity is required. Iron is quite suitable and since no special strength properties are required, cast iron plates are used. The thickness is fixed at 6" from shielding considerations and the complete shield is made up of plates approximately 3′ x 4′ with interlocking joints so that no straight-through path exists in any direction, through which radiation or neutrons can escape. These plates are individually supported on steel girders 49 cast in with the concrete of the main shield.

The thermal shield 18 is also quite an efficient absorber of slow neutrons. Such absorption gives rise to δ-radiation which will not be satisfactorily stopped when produced near the outer surface of the shield 18. It is not very effective in slowing down fast neutrons by elastic collisions because of the high atomic mass of iron, but it has a moderate cross-section for inelastic scattering and does contribute to the reduction of the number of fast neutrons leaving the pile.

At least one face of the thermal shield 18 is in contact with the cooling air stream and because of the relatively high conductivity, the heat generated throughout the volume of the shield is easily transferred to the coolant.

Even at the outside of the thermal shield, the neutron and δ-ray intensity are still very much above biological tolerance. Slightly different considerations apply in this shield. Although there is still considerable δ-ray radiation to be stopped, particularly that emitted in the outer regions of the thermal shield due to neutron absorption there, a more important function is to absorb as completely as possible all thermal neutrons and to slow down any fast ones. For this reason a material rich in hydrogen is desirable, for this element combines an ability to slow down fast neutrons very rapidly because of its low atomic mass, with a high capture cross-section. High density is desirable to eliminate δ-radiation, which not only enters from the thermal shield 18 but is also produced in the biological shield 3 by the neutrons absorbed there.

A material giving a good compromise of these factors with economic considerations is concrete. The mix and method of placing is chosen to give the highest possible density and this is obtained by using barytes instead of normal aggregate. The density attainable if the normal aggregate is wholly replaced by barytes is 3.5. The density actually obtained in the shield 3 is 3.2. With flint aggregate the figure would be about 2.3 and its use would involve increasing the shield thickness by 3.2/2.3 or approximately 40%.

The two thermal columns 17 and 16 (Fig. 17) extending from the main graphite block 1 through the shield 3, one on the experimental side E of the pile and the other at the top T consist of columns of the highest grade of graphite supported in cast-iron framing 50 built into the shield. Their function is to provide a beam of slow neutrons at the shield face for experimental purposes.

A short spur of graphite projecting from the reflector region 15 (Fig. 6) abuts the columns, with a clearance of about half-an-inch. Any fast neutrons crossing into the thermal columns are slowed down; since the length of the columns (about 6 to 7 ft.) is many slowing down lengths there is negligible fast neutron flux at the column faces. The graphite in the columns is also quite effective in attenuating the gamma flux. A 7″ thick bismuth sheet 50a (Fig. 17) is provided at the inner face of the top column to give additional reduction of the gamma flux; bismuth is relatively transparent to thermal neutrons. It is not structurally feasible to provide a similar bismuth shield at the side column.

The inner faces of the cast-iron framing 50 are lined with 0.08 in. of cadmium to absorb slow neutrons and prevent their entry into the biological shield and through this to the working area of the pile building. The cadmium shielding gives some collimation to the emergent neutron beam.

The faces of the columns are normally closed by cast iron shields 25 filled with lead and faced internally with 0.08 in. cadmium sheet. This ensures that there is no escape of neutrons or gamma radiation into the building when the columns 16 and 17 are not in use. These shields 25 can be removed in sections, or small areas over experimental holes in the shields can be opened up when experimental neutron beams are required.

Figure 17:
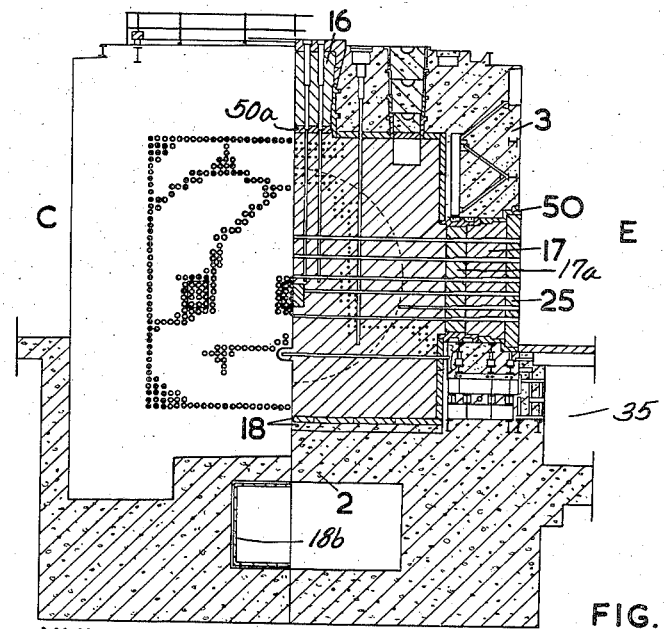
Fig. 17 is a section on the line XVII—XVII of Fig. 13 (unload face).

The slow neutron beam is attenuated along the thermal column so provision is made for the removal of a portion of the columns when higher fluxes are required. At the top column 16 the whole of the graphite can be removed; reasonable protection from gamma radiation is provided by the bismuth shield 50a (Fig. 17). Because there is no bismuth shield on the side column 17, the inner 2 ft. of graphite 17a shown therein is made non-removable.

Control rods are provided to maintain the effective multiplication constant of the pile at zero for steady operation, to increase or decrease it slightly when it is necessary to alter the power level and to provide an adjustment to compensate for deterioration of the pile or for the insertion of experimental material.

Four main control rods C1 to C4 (Figs. 12, 15, 16 and 19), each capable of absorbing 0.3% in $k$ and a fine control rod C5 with one tenth this range are arranged to enter the pile horizontally from the control face, the main rods C1 to C4 being spaced on a semi-circle of radius 3′6″ from the centre line, with the fine control rod C5 offset at 8′6″ from the centre as most clearly shown in Fig. 19.

The neutron absorbing material is boron in the form of boron carbide powder which is conveniently refractory material. This is contained in a mild steel tube 2″ O. D. and 25 ft. long, of which the first 17 ft. is boron carbide and the remaining 8 ft. is lead and concrete acting as a shield against radiations streaming along the tube and entrance hole. The rods C1 to C5 inevitably become active and it is therefore necessary to provide an extended shield 52 (Figs. 12 and 16) outside the pile enclosing the rods when fully withdrawn.

The rods C1 to C5 are positioned to an accuracy of 1/10 mm. and the position is indicated at a control point to the same accuracy. A 22 ft. extension 208 to the rod is connected to a moving head 201 incorporating a D. C. motor 202 and pinion 203 driving on a fixed rack 204 with guide rails 205. This system requires less space than a fixed head and moving rack, although it involves a little extra complication in cabling. The rack and pinion are cut to give the necessary positional accuracy and a multiple geared differential magslip device 206 driven by a pinion 207 engaging the rack is used to set and indicate the rod position; three dials operated from the magslip device and situated in the control room enable this position to be read to the required accuracy over the full range of movement of 1000 cms. A rectifier and amplidyne generator (not shown) convert the voltage induced in the differential magslip to D. C. power directly feeding the armature of the driving head motor.

The controls are so arranged that the four coarse control rods C1 to C4 may be moved individually or as a group, at fast or slow speed, by push-button control; alternative handwheel control for each rod is provided. All these are located at a main control desk in the control room CM (Fig. 10). Interlocks, safety devcies, etc. of conventional design are incorporated to prevent damage to the mechanism or to the pile.

Two independent banks of shut-off rods SO are also provided each bank being capable of reducing $k$ by 1.2% and ensuring that the pile closes down. Six rods are used in each bank and all the rods in one bank are normally operated together; they enter the pile vertically from the top face and are spaced round a circle of about 6 ft. radius from the centre of the face and lie just outside the top thermal column 16 as seen in Figs. 13 and 21.

The time-constant of the pile requires that the rods SO can be fully inserted in less than one second, including the time of operation of alarm and actuating mechanisms.

The rods are injected into the pile by individual direct-acting pistons operating at 100 p. s. i. air pressure which is maintained all the time. They are raised and held up against this pressure by air at 500 p. s. i. acting via a floating piston on an hydraulic jack system. A suitable mechanism is fully described in copending patent application Serial No. 791,022 filed December 11, 1947 by Lawrence and Ginns, now abandoned.

The rods SO are mild steel tubes 3⅛" O. D. and 7 ft. long filled with boron carbide except for the outermost 6" which contains lead for shielding purposes. The rods normally lie in the biological shield 3 and do not become strongly active.

Operation of the safety circuit which sends both sets of 6 rods into the pile is arranged to occur for any of the following reasons:

(1) Failure of main power.
(2) If all the coarse control rods C1 to C4 are fully into the pile.
(3) If less than 4 main exhausters 31 or both auxiliary exhausters 33 are running.
(4) If temperature difference between in and out air flows exceeds a preset value.
(5) If current (i. e. power level) of any of 4 ion chambers (1 and 3 moving and 2 and 3 fixed) rises above a preset value.
(6) If any shut off health chamber records activity above a preset value.
(7) If due to a failure, any one shut off rod SO drops into the pile.
(8) If any shut off button is operated.

In the event of any of these automatic shut down devices operating, a red light and an alarm bell will indicate a shut down and a flag signal will indicate the device which operated. The position of all shut off rods is indicated by lamps—red in, green out.

The experimental facilities are indicated and tabulated on Figs. 18–21 together with leading dimensions. They will now be treated in greater detail.

The thermal columns 16 and 17 (Fig. 17) already described provide a large volume of material in which a high neutron flux is available. The slow neutron current into the inner face of the column is approximately $2 \times 10^7$ neutrons/cm.²/sec. and the slow neutron flux at a depth of 1 foot from the inner surface is approximately $3 \times 10^7$ neutrons/cm.²/sec.

The top thermal column 16 is approximately 6 feet square and 8 feet in depth. It contains about 16 tons of graphite which can be removed in two layers, each layer containing 8 interlocking graphite blocks which may be removed singly. At the bottom of the column is the sheet of bismuth 50a, 7 inches thick, which will reduce the gamma flux sufficiently to enable the graphite above it to be removed and an experiment set up without it being necessary to remove the hot slugs adjacent to the thermal column.

The side thermal column 17 is approximately 10 feet square and 7 feet in depth. It is not possible to support a sheet of bismuth in a vertical plane at the base of this column, so the graphite can only be unstacked to a depth of 6 pitches, leaving 3 pitches of graphite which must always remain in place to provide gamma protection.

The graphite in the side column 17 can only be unstacked in separate bricks and not in composite blocks. The top thermal column 16 is generally used when it is desired to remove graphite to arrange an experiment while the side thermal column is used as a source of neutron beams. A clear space in the wall of the building opposite the side thermal column is provided with a large aluminium sheet window to allow a beam to be used over a long distance.

Sixteen thermal experimental holes TE 4 in. diameter pass through the top thermal column 16 and extend to the centre line of the pile. They are normally filled by graphite stringers and lead plugs. The plugs and stringers when withdrawn can be placed in one of 16 mortuary holes provided in the floor of the building.

Six experimental holes E similar to TE above but out-side the thermal column 16 are also provided in the top face. Plugs and stringers from these holes can also be accommodated in any of the 16 mortuary holes in the floor of the building.

In the experimental face there is a total of 45 square experimental holes E1 to E6—these holes enter the pile horizontally from the experimental face, 12 lying within the side thermal column while 23 penetrate to the control face. All the holes have identical tubes and plugs in the shielding of the type shown in Figs. 8 and 9 except in the case of holes entering through the side thermal column door where short lead plugs are provided. Graphite stringers fill the holes when not in use. Ten mortuary holes ME are provided in the shield to accommodate plugs and stringers from these holes. They are square stainless steel tubes which run from side to side through the top of the biological shield 3.

Four large animal holes A1 traverse the pile from the experimental to the control face through the bottom two layers of graphite. On the experimental face those holes A1 are provided with stepped plugs and access is from the biological lab. 35. On the control face end the holes are unplugged, and open into a small pit. Two large animal holes A1 and A2 and one small animal hole A3 are provided in the control face. These penetrate to the edge of the reacting core and are provided with stepped plugs similar to the plug shown in Fig. 9.

Two cavities S known as sack holes approximately 30" x 5'6" x 30" deep are provided in the top surface of the graphite. Access is by removal in sections of stepped concrete plugs. They are provided for the irradiation of large articles of low neutron capture cross-section.

Eight measuring holes M in the top shield penetrate to the top graphite face and are provided with stepped plugs. They are to enable measurements to be taken of the top graphite face at 8 points along the centre line of the pile to detect graphite growth.

To enable air temperatures to be taken at the exit from individual air channels and to detect any fission products in the cooling air, 43 2⅝" dia. holes PY are provided in the top shield, just beyond the edge of the graphite air outlet face, to plumb each of the 43 vertical rows of load end bridge tubes 9. Each bridge trough 9a (Fig. 3) is bored with a 1½" dia. hole to allow the tapes associated with the detection apparatus (hereinafter described) to pass down the row. The holes are normally filled with stepped plugs.

Three 4½ dia. holes P are provided through the top shield into both inlet and outlet air spaces. These holes allow a periscope to be used to observe the general condition of the pile. The holes P are normally filled with stepped plugs.

Two removable graphite cores GC (Fig. 20), 3 pitches wide x 3½ pitches deep run the length of the pile from load to unload face. They are identical to the remainder of the graphite mass except that they are so made as to be removable in one piece. A complete section of shield 3 (Fig. 15), including bridge tubes 9, is removable opposite each end of each removable core, to allow the core to be removed and an experimental rig inserted.

Apart from the cooling due to the reactor channels 6 (Fig. 16) and reflector channels 6a subsidiary cooling of the thermal shield shut off rods and control rods is provided for. Air is admitted from the inlet header 4 to a narrow space 200 (Figs. 1 and 2) between the graphite 1 and the 6" cast iron plates of the thermal shield 18. Vents (not shown) in the form of small bore pipes cast into the concrete shield open into the said space 200 and by-pass some of the air through channels AE1–6 (Fig. 20) which communicate with and provide cooling air for shut-off rods, experimental holes, etc. This composite air flow removes the heat generated in the thermal shield.

The shield 18 is essentially isothermal so that the temperature of the inner surface of the concrete 3 is that of the inside of the shield 18. The temperature gradient in the concrete is a few degrees per foot at most.

The cast iron base 18a on which the graphite 1 is supported and which is also the lower thermal shield is cooled by four channels AF (Fig. 20) of area 2 sq. ins. each, cut in the lower surface of the graphite 1 and running direct from inlet to outlet face.

Air is also admitted to the chambers through channels ch (Fig. 15) in the base 2 of the main pile. The heat generated in the concrete in this region is much less than that in the thermal shield 18 and temperature rises are negligible.

At the air outlet end of the pile (the load end) there is a space 3a (Figs. 1 and 2) between the thermal shield 18 and the concrete 3, extending some distance back along the sides and top and contained along the outlet 7 duct for 23 ft. Air is admitted from the building into this space, through 59 pipes, 1" dia. (not shown) let into the concrete shielding walls and foundations.

The heat generated in a central rod C1—C5 under the worst conditions, i. e. a rod fully in, with the pile operating at its maximum level of 6000 kw., is 400–500 watts.

Each control rod channel is vented by a hole A1 (Fig. 20) entering from the air inlet face to one end of the channel. At the other end of the control rod channel a hole AE1 discharges to the air outlet face of the pile. The effective area between the rod and its channel is about 2 sq. ins. while that of the venting channel is 3 sq. ins.

Should a shut-off rod be left in the pile while running at full power (a possibly unavoidable fault condition), the heat generated in it would be about 350 watts. The hole in which it runs is vented by a channel AE5 connecting its lower end with the air outlet face of the pile; air enters from the interspace between graphite 1 and thermal shield 18.

All of the experimental holes except the large animal holes receive air from the graphite thermal shield interspace and discharge it through vents AE2 and AE4 to the air outlet face. The large animal holes A1 and A2 and the ion chamber recesses intercept the reflector cooling channels 6a but the heat to be removed is in any case negligible.

The heat to be removed from an experimental hole depends on the use to which it is put. If not in use, they are filled with graphite stringers and although no venting air then flows, general cooling is effected by the main cooling channels, 6 and 6a.

Regular production of a range of isotopes is a primary function of the pile and this necessarily involves a reduction in the available multiplication constant.

Compromising the various factors involved, 0.2% of the available ($k$) is allotted to the production of isotopes. This figure is chosen, somewhat arbitrarily, because the rate of isotope production increases more slowly as more $k$ is utilised and because it is sufficient for the total isotope production requirements. The remainder is retained for control and experimental purposes. Also, from considerations of self-shielding and neutron economy it is arranged that the concentration of loading does not reduce the resultant local diffusion length below about 17 cms. and that the inner portion of the reflector is not loaded unless the cross-section is very small. The relative thicknesses of the loaded and unloaded portions of the reflector vary with the cross-section of the material.

The methods of introduction into the pile and subsequent handling depend on the substance. Regular production of isotopes in steady demand is done by charging the reflector channels with the material to be irradiated suitably contained in cans similar to those for the uranium slugs and which can be handled by the same machinery. Experimental irradiations are made in special cans inserted into some of the experimental graphite stringers in which the whole range of neutron densities is available. Materials having a very low absorption cross-section can be irradiated in bulk in the "sack holes" at the top of the pile. The products are in all cases active and suitable precautions are necessary in handling.

A channel 6 (Fig. 3) or 6a (Fig. 16) through the pile is loaded by the simple process of manually pulling out a plug 13, inserting in its place a long stainless steel tube or snout which lays in a trough 9a (Fig. 3) into the graphite and then placing the cartridge (or article to be irradiated) into the snout and pushing it into the pile by means of jointed aluminium rods.

It will be understood that only the central twenty feet of each uranium channel is loaded with uranium cartridges, the outer three feet of graphite at each end constitutes a reflecting zone at the ends of the cylindrical reacting zone 14 (Fig. 6).

The holes in the reflecting zone 15 are loaded with containers filled with materials for irradiation for the production of isotopes in the same manner as for the uranium cartridges.

Figure 12:
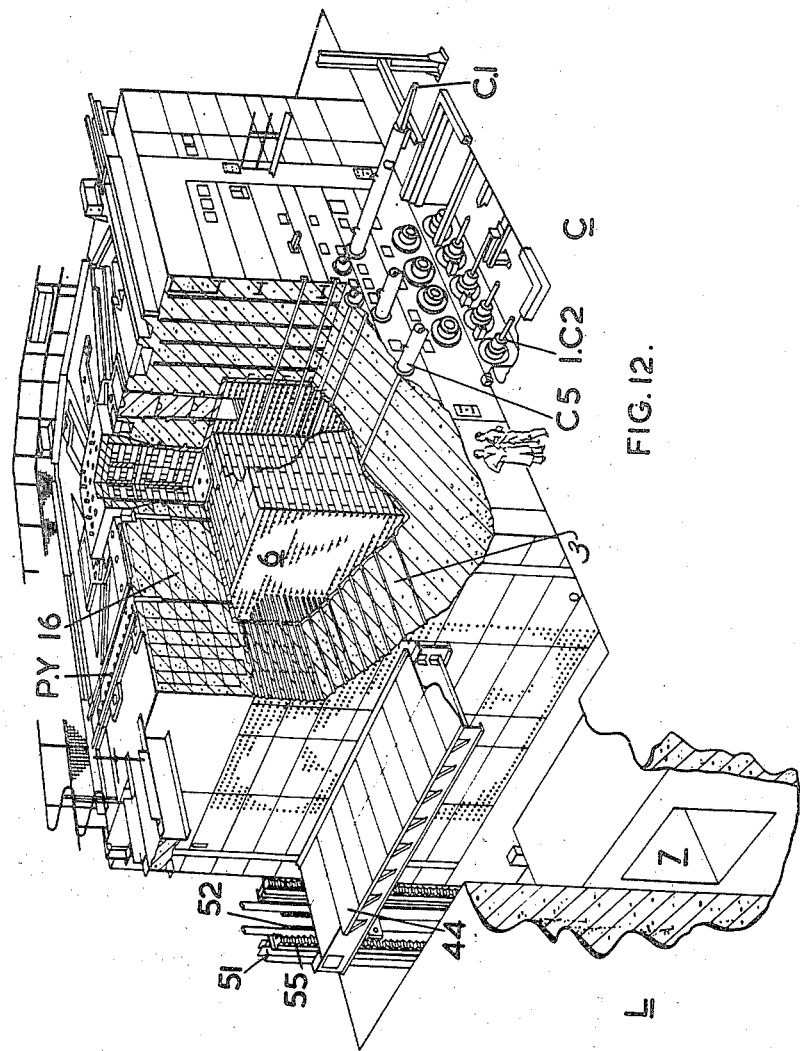
Fig. 12 is a perspective view, partly broken away, of the reactor from the control and load faces.
Figure 15:
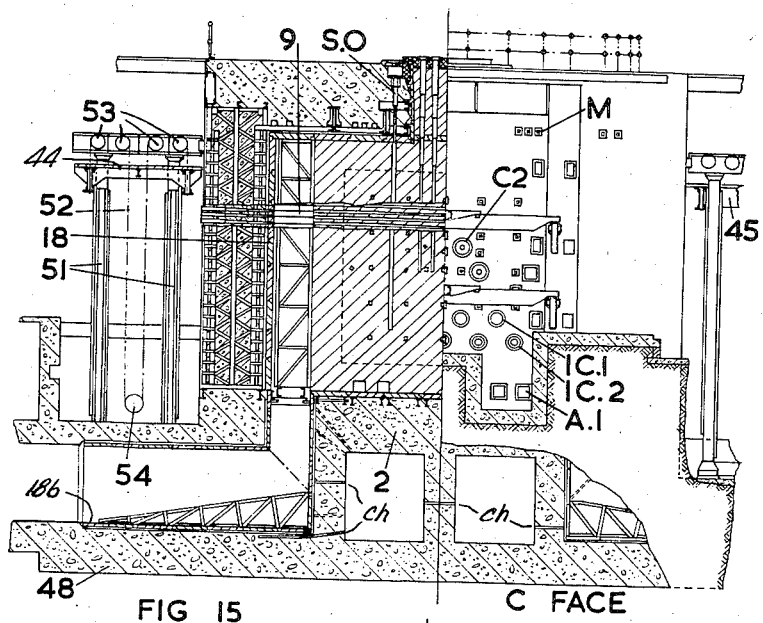
Fig. 15 is a section on the line XV—XV of Fig. 13 (control face).
Figure 16:
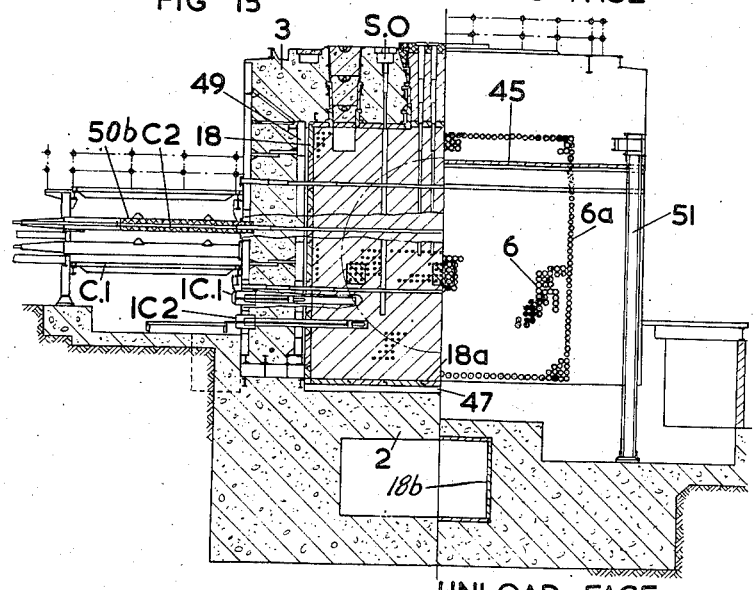
Fig. 16 is a section on the line XVI—XVI of Fig. 13 (unload face).

During the process of loading, the load hoist 44 is raised and lowered as necessary to give a convenient working height for the hole being loaded. The load hoist 44 and unload hoist 45 are similar and are shown in Figs. 12, 15 and 16 as comprising a platform 44 or 45 extending the full width of the pile between pairs of guide stanchions 51 and supported by a massive roller chain 52 which passes over fixed sprockets 53 and under a moving sprocket 54 secured to the crosshead of a hydraulic cylinder (not shown). The platforms are suspended from the ends of the chain 52 and as the crosshead moves up it allows the platform to descend and vice-versa. The guide stanchions are formed with a series of stops 55 (Fig. 12) having the spacing of the pile lattice so that the hoist platform can be accurately located with respect to each horizontal row of channels.

Unloading is effected similarly by the simple process of pushing the cartridges out of the channels by means of jointed rods. In this case, however, it is necessary to provide at the unload face a heavy shielded container known as a "coffin" 56 (Figs. 22 and 23) and a travelling trolley 57 for the coffin.

Figure 23:
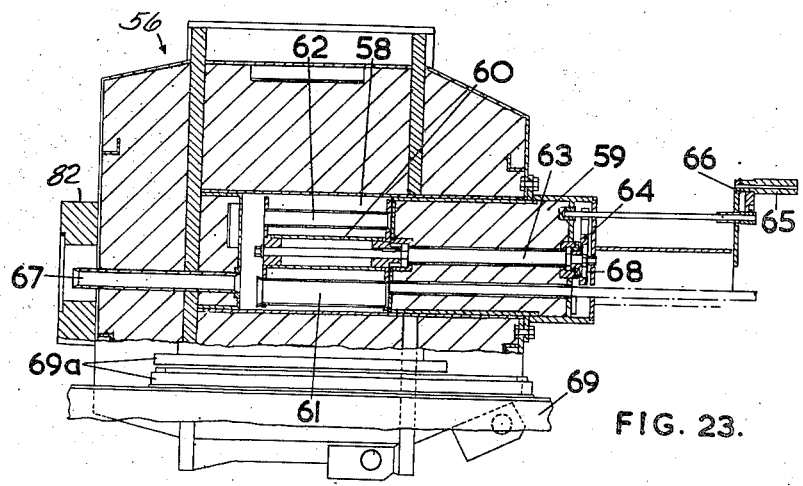
Fig. 23 is a vertical longitudinal section through the unload coffin.
Figure 20:
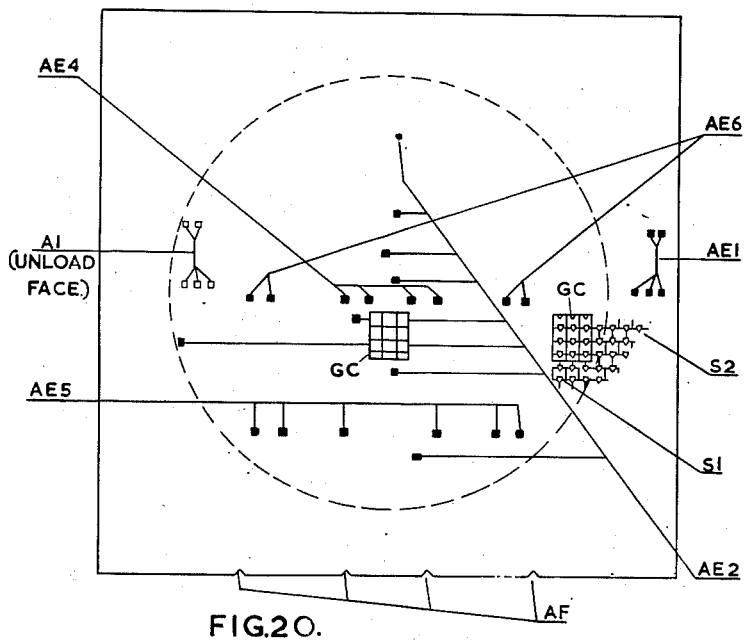
Fig. 20 is a diagram of the load and unload faces.

The coffin 56 as shown in Fig. 23 comprises a lead filled steel container having a cylindrical cavity 58 closed by a plug 59 which supports a rotary magazine 60. The magazine 60 consists of ten tubes 61 of flattened section to take two cartridges one above the other and two plug tubes 62.

Figure 22:
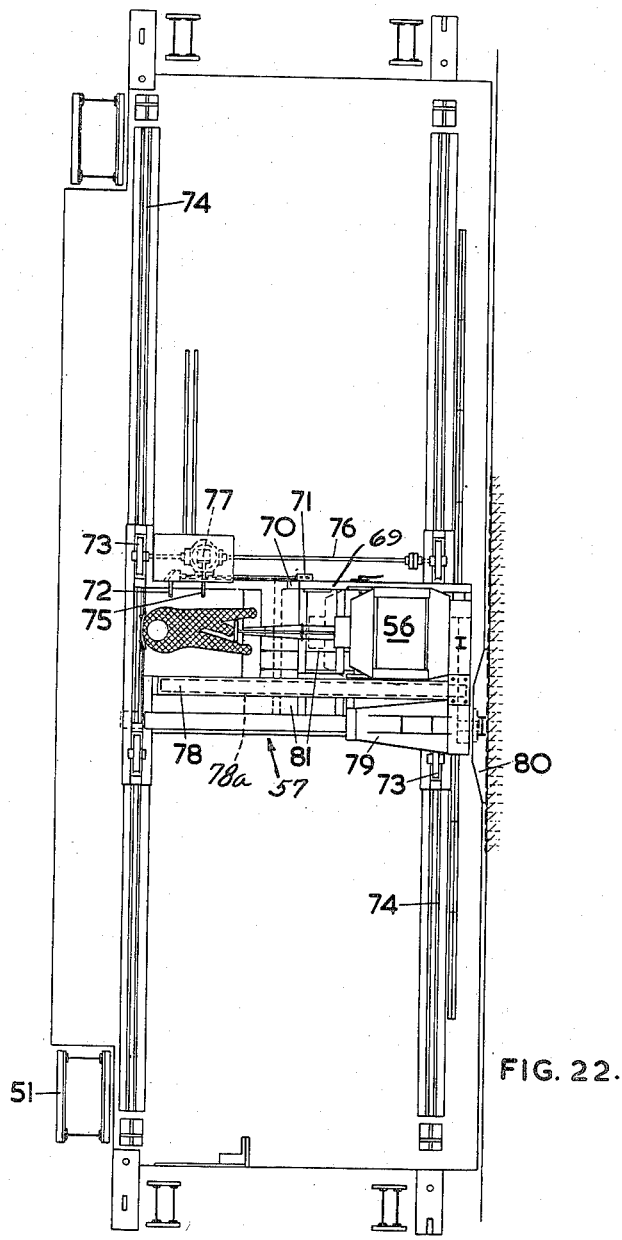
Fig. 22 is a plan view of the unloading machine and hoist.

The shaft 63 of the magazine 60 is connected through 4 to 1 gearing 64 to a handle 65 which can be located in any one of three positions by a spring detent device 66 to bring successive tubes 61 or 62 into line with the coffin load tube 67. An indicating dial 68 shows which tube 61, 62 is in line with the tube 67. The coffin is supported on a subframe 69 of trolley 57 by bearers 69a. Referring to Fig. 22 the subframe 69 is mounted to slide to and from the unload face U of the pile on roller bearing guides 70, and is driven by a rack and pinion mechanism 71 operated from a handle 72. The trolley 57 is mounted on wheels 73 running on transverse rails 74 laid on the platform of the hoist and can be traversed by turning a handle 75 which drives the shaft 76 of two of the wheels 73 through gearing 77.

Also mounted on the sub-frame 69 and spaced three pitches therefrom is a snout holder 78 and two further pitches away a plug container 79.

Telephone communication is provided between the operator of the unload machine and the operator at the load face. When it is required to unload a channel a lead blanket 80 is secured to the pile face around the channel and the trolley traversed by the handle 75 until the plug container 79 is in line with the channel.

An extractor rod is then threaded through the plug container 79, screwed into the end of the plug 12 (Fig. 3) closing the channel and pulled to withdraw the plug 12 into the container 79. The sub-frame 69 is then retracted and the trolley traversed two pitches until the snout tube holder 78 is in line with the plug hole whereupon a snout tube 78a contained therein is pushed into the channel. The trolley is again traversed, this time three pitches, until the coffin is in line with the channel.

The subframe 69 is then moved towards the pile face from the broken line position 81 until a spigot 82 (Fig. 23) on the coffin enters a complementary socket in the blanket 80.

The operator then signals that he is ready to receive the cartridges and, the operator at the load face having inserted a loose lead plug into the channel pushes the plug and the string of cartridges through the channel. Firstly one drops into an elongated tube 61 (Fig. 23) and then another enters on top of it. The magazine 60 is then turned one step and two more cartridges received in the next tube 61 and so on until a string of twenty cartridges have been received. The said loose lead plug is finally pushed into the coffin load tube 67 to seal the coffin which may then be carried away by the high level hoist 43.

Ion chambers measure the neutron flux at particular points in the pile and by virtue of a survey of neutron density over the whole volume, give an indirect measurement of the maximum and mean fluxes and hence of the power level at which the pile is operating. This power level is cross-checked by air flow and temperature measurements but this latter method gives a reliable result only after operation at a steady level for more than four hours whereas the neutron measurement gives an almost instantaneous figure.

They are therefore used for all control and monitoring operations and, more particularly, for the primary alarm and safety systems. They have a variety of functions and must operate over a wide range of power levels—from a few watts to megawatts—and since the safety of the pile and the operators depends on them, the combination must be absolutely reliable. Nine chambers are therefore provided in the control face, four fixed chambers 1C1 and five movable chambers 1C2. They enter from the lower half of the control face as seen in Figs. 12 and 16 and can be inserted as far as the edge of the reacting core but in general are set farther back in less sensitive positions. As indicated in Fig. 19 they are placed as far away as possible from any device, such as a control rod, which disturbs the neutron distribution. The minimum distance is of the order of 1 metre (3 ft.) i. e. about two diffusion lengths.

The fixed chambers 1C1 cover only the high range and their position is fixed during the final calibration of the pile output; a small range of movement with micrometer adjustment is provided to accommodate the expected small variations in sensitivity between chambers as they are replaced. One of the chambers 1C1 is supplied from a battery to be completely independent of external power sources and is designed to be as simple and reliable as possible; it operates a galvanometer directly which is calibrated in terms of power level. It can therefore continue to operate in the event of complete failure of main and auxiliary power supplies and will give an indication after shut down of the pile. It is, in effect, the last line of defence in the monitoring system. The output from it is also amplified to operate a high speed recorder which provides the operator with the immediate past history of the pile, to show the trend of any fluctuations in operating level. Two other fixed chambers 1C1 feed into amplifiers whose outputs operate continuous low speed recorders, one of which includes an integrating meter to give megawatt-hours of operation. Both amplifiers energise relays connected into the alarm and safety circuits to shut down the pile if the power rises above a pre-determined level. The remaining fixed chamber 1C1 is a spare.

As noted above, the fixed ion chambers 1C1 only cater for high power operation; at the lower levels the movable chambers 1C2 are used.

The movable chambers 1C2 are arranged so that they can be inserted to the limit of their travel, where their sensitivity (with amplifiers) is sufficient to give a full scale deflection for a power level of 1 kw. During a start-up period, as the normal operating level is progressively increased, they are moved out to give sensitivities of 10, 100, 1000 and finally 10,000 kw. The corresponding positions are noted so that a particular sensitivity can be reproduced if at any time it is desired to operate at levels below the maximum. Position indicators are fitted at each setting and reproduced at a control panel in the control room 53. Interlocks are arranged so that the pile cannot be run at high power if the chambers 1C2 are in sensitive positions and to ensure that all those in use are set for the same sensitivity. One movable chamber 1C2 operates a high speed recorder and a giant indicator and another a low speed recorder; both have relays connected into the alarm and shut down circuits to act as safety devices at any desired power from about 1 kw. upwards. A third movable chamber 1C2 includes in its circuit a backing-off potentiometer, a three position sensitivity switch and a centre-zero indicator and high speed recorder. By these means the zero indication can be set for any power, and variation from this power can be read off directly; the sensitivity can be increased by factors of 10 and 100 so that small drifts and variations can be readily observed. For example the potentiometer might be set for 8 kw.; the indicator, if on the least sensitive scale, would then read $8 \pm 5$ kw., i. e. from 3 to 13 kw. With maximum sensitivity the scale would read $$8 \pm \frac{5}{100}$$

or from 7.95 to 8.05 kw. This increased sensitivity can also be used to extend the range of power measurements below 1 kw., the normal full scale value when the movable ion chambers are in their most sensitive position, down to a few watts. The fourth and fifth movable chambers 1C2 are spares.

The ion chambers are of the type consisting of a sealed steel chamber of 4.7 litres capacity filled with $BF_3$ at a pressure of 7.8 cms. Hg. A potential of about 1000 volts is maintained between a central electrode and the case. The current resulting from the ionization produced by neutron reactions on boron is a measure of the thermal neutron flux.

Figure 24:
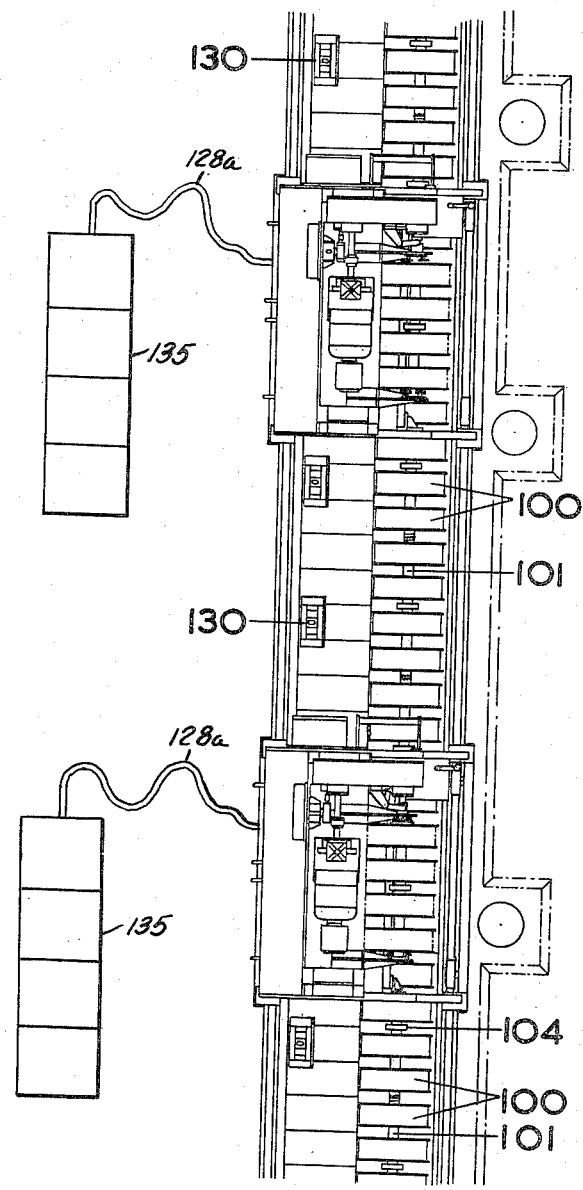
Fig. 24 is a plan view of the apparatus for detecting the presence of active dust in the air discharged from the channels in the pile.

The apparatus for detecting the presence of active dust such as active uranium oxide particles at the outlets of the uranium channels 6 is shown in Figs. 24 to 27. In line with and immediately above the plumb holes PY are forty drums 100 (Fig. 24). They are arranged in ten groups of four, each group being mounted on a common spindle 101 and normally allowed to rest idly upon a pair of flat rollers 102 at one end and a pair of V-edged locating rollers 103 at the other end. Fig. 25 shows one group of four drums lifted off its supporting rollers 102 and 103 and mounted upon a winding trolley 111, leaving the adjacent groups of drums in position above the plumb holes PY. The adjacent groups in Fig. 25 are not complete, two drums only being shown of one group and three of the other groups. At the centre of each spindle 101 is a brake pulley 104 engaged by brake shoes 105 (Fig. 26) operated by a link mechanism from a pedal 106.

Each drum 100 is wound with a length of absorbent cotton cord 107 which passes down into a respective plumb hole PY and is maintained taut by a plumb bob (not shown). The cord 107 can be clamped between an anvil 108 and a spring actuated plunger 109 which can be maintained in the released position shown in Fig. 26 by compressed air from a supply controlled by a lever 110.

Two winding trolleys 111 are mounted on rails 112 extending across the top of the pile on each side of the holes PY.

On the top of each trolley 111 is a carriage 113 mounted on rollers 114 and adapted to be traversed by a lead screw 115, and nut 116. The carriage 113 is provided at one end with a pair of flat rollers 102a and at the other end with a pair of V-edged rollers 103a similar to the rollers 102 and 103 from which latter a group of four drums can be manually lifted and mounted upon the rollers on the carriage, as shown in the drawings. When so mounted, a dog clutch 117 operated by a lever 118 couples the spindle 101 to a gear box 119 driven by a Ward-Leonard motor generator set 120. The speeds and direction of the motor set 120 is controlled by a cam operated switch mechanism 121 driven through a shaft 122 from the gear box 119.

When the drums 100 are mounted on the trolley 111, the cotton cords 107 pass over pulleys 123 and then vertically downwards in front of Geiger counters 124. Sliding doors 125 operated through a link mechanism 126 from a lever 127 give access to the counters 124 and enable the cords 107 to be inserted.

The counters 124 are each connected to probe units and amplifiers 128 from whence cables 128a (Fig. 24) run to automatic recorders 135.

Each trolley 111 is locked in position relative to the holes PY by a bolt 129 which engages a hole in any one of five stop blocks 130. The bolt 129 is released by a cable mechanism 131 from a hand lever (not shown) on a handlebar 132.

In using the detecting apparatus, all drums 100 are initially dismounted from the trolleys 111 and are resting over the holes PY. The clamps 108, 109 holding any one set of four cords are pneumatically released by operating a lever 110 and the brake pedal 106 applied to ensure steady but rapid descent of the cords under the action of their plumb bobs until a predetermined mark on the cords reaches the anvil 108. The brake is then fully applied to stop the cords and the lever 110 moved to operate the clamp. The cords are then allowed to "soak" in the cooling air issuing from the uranium channels in front of which they are situated for a period of twenty minutes. At the end of this time the sliding doors 125 are moved clear of the counters 124 by means of the lever 127, the four drums lifted on to the trolley, the doors 125 moved back over the counters and the clutch 117 engaged by moving the handle 118. The clamps 108, 109 are then released and the motor 120 started by moving a switch 133 to a "haul" position. The switch mechanism 121 is such that a very rapid haul takes place until that part of the cord which was in front of the uppermost cooling channel is approaching its Geiger counter 124. The cams in the mechanism 121 are then arranged to switch the motor 120 to slow speed until the last potentially active portion of the cord has passed its counter 124. During the haul the lead screw 115 has transvered the carriage 113 to ensure even laying of the cords in the helical grooves of the drums 100. Operation of the switch 133 to a second position is arranged to drive the lead screw 115 at a fast rate to reset the traversing carriage ready for hauling a further set of four drums 100.

During the slow haul during which the potentially active length of the cord is passing the counter, the amplified output of the Geiger counters 124 is fed to the associated bank for four automatic recorders 135 and hence a deflection on any one record caused by active dust particles on the cords can be identified with a particular channel in the pile in accordance with the position of the deflection along the record and remedial measures taken as necessary.

The essential data of the reactor above described are tabulated as follows:

| Dimensions and Weights | English | Metric |
| --- | --- | --- |
| Lattice (of lines thru centers of cartridges): | | |
| Lattice pitch | 7.25 in | 18.4 cm. |
| Area of Lattice cell | 52.50 sq. in | 339 sq. cm. |
| Uranium slug diameter | 0.9 in | 2.28 cm. |
| Aluminium sheath thickness | 0.025 in | 0.063 cm. |
| Cartridge diameter | 0.95 in | 2.41 cm. |
| Area for empty channel (standard) | 3.42 sq. in | 22.0 sq. cm. |
| Area for empty channel (enlarged end) | 5.14 sq. in | 33.2 sq. cm. |
| Area of air passage above cartridge (std.) | 2.67 sq. in | 17.2 sq. cm. |
| Area of air passage above cartridge (enlarged end) | 4.38 sq. in | 28.2 sq. cm. |
| Area of air passage below cartridge | 0.05 sq. in | 0.32 sq. cm. |
| Cross sectional area of graphite | 49.08 sq. in | 316.5 sq. cm. |
| Equivalent rod radius $a$ | 0.45 in | 1.14 cm. |
| Equivalent sheath thickness $t$ | 0.027 in | 0.07 cm. |
| Equivalent channel radius $c$ | 1.04 in | 2.65 cm. |
| Equivalent air-gap $(c-a)$ | .59 in | 1.50 cm. |
| Equivalent cell radius $b$ | 4.1 in | 10.4 cm. |
| Ratio of cell diameter to rod dia. $\frac{b}{a}$ | | 9.1 |
| Volume ratio—graphite uranium $\left(\frac{b^2-c^2}{a^2}\right)$ | | 77.5 |
| Ratio of standard channel area to lattice area | | 0.065 |
| Ratio of standard channel area to graphite area | | 0.070 |
| Lattice shape | | Square |
| Shape of channel—V groove with rectangular top. See Fig. 20. | | |
| Core: | | |
| Shape—horizontal cylinder. | | |
| Length | 20 ft | 610 cm. |
| Surface area | 1,884 sq. ft | 1.75 10⁵ sq. cm. |
| Volume | 6,280 cu. ft | 1.78 10⁸ cc. |
| Number of channels | | 888 |
| Volume of channels | 50 cu. ft | 1.4 10⁶ ccs. |
| Volume of graphite | 6,230 cu. ft | 1.77 10⁸ cc. |
| Weight of graphite (density 1.67) | 269 tons | 273 tonnes. |
| Diameter of slug | 0.9 in | 2.28 cm. |
| Length of slug | 12 in | 30.5 cm. |
| Cylindrical surface area | 34 sq. in | 219.5 sq. cm. |
| Volume of slug | 7.62 cu. in | 125 cc. |
| Weight of slug (density 18.75) | 5.15 cu. in | 2.34 kg. |
| Number of slugs per channel | | 20 |
| Weight per channel | 103 lb | 46.8 kg. |
| Total number of slugs | | 17,760 |
| Total weight of uranium | 41 tons | 41.5 tonnes. |
| Reflector: | | |
| Shape—to complete a 26' cube. | | |
| Thickness (minimum) | 3 ft | 91.5 cm. |
| Number of channels | | 918 |
| Volume of channels | 80 cu. ft | 2.24 10⁶ cc. |
| Volume of graphite | 11,220 cu. ft | 3.18 10⁸ cc. |
| Weight of graphite (density 1.67) | 485 tons | 492 tonnes. |
| Surface area of cube | 4,050 sq. ft | 3.77 10⁶ cc. |
| Surface area of inscribed cylinder | 3,190 sq. ft | 2.96 10⁶ cc. |

(Ion Chamber, control and shut-off rod holes reduce the above weight by 1–2 tons. All experimental holes are filled with graphite stringers except when in actual use.)

| Dimensions and Weights | English | Metric |
| --- | --- | --- |
| Top thermal column: | | |
| Cross section (6'11" square, mean) | 47.5 sq. ft | 4.4 10⁴ sq. cm. |
| Depth (all graphite removable) | 6'11⅝" | 216 cm. |
| Weight of graphite (approx.) | 16 tons | 16.25 tonnes. |
| Thickness of bismuth shield | 7 ins | 17.8 cm. |
| Thickness of cadmium lining | .080 in | 2 mm. |
| Thickness of lead door | 12 in | 30.5 cm. |
| Side thermal column: | | |
| Cross section (10'3" square, mean) | 105 sq. ft | 9.75 10⁴ sq. cm. |
| Depth—fixed graphite | 1'9¾" | 55 cm. |
| Depth—removable graphite | 3'7½" | 110 cm. |
| Depth—total graphite | 5'5¼" | 165 cm. |
| Weight of graphite (approx.) | 27 tons | 27.4 tonnes. |
| Thickness of bismuth shield | | None |
| Thickness of cadmium lining | .080 in | 2 mm. |
| Thickness of lead door | 12 in | 30.5 cm. |
| Overall: | | |
| Shape—cube with projecting thermal columns. | | |
| Length of side of cube | 25'11¾" | 793 cm. |
| Area of face | 675 sq. ft | 6.3 10⁵ sq. cm. |
| Surface area of cube | 4,030 sq. ft | 3.78 10⁶ sq. cm. |
| Volume of cube | 18,550 cu. ft | 5.010⁸ cc. |
| Weight of graphite | 796 tons | 810 tonnes. |
| Weight of bismuth | 7.25 tons | 7.36 tonnes. |
| Weight of cadmium | 1.3 tons | 1.3 tonnes. |
| Shielding structure: | | |
| Thickness of C. I. thermal shield | 6" | 15.2 cm. |
| Thickness of concrete biological shield—sides | 6'6" | 198 cm. |
| Thickness of concrete biological shield—top | 7'6" | 228 cm. |
| Width of air channels at load and unload faces | 4'0" | 122 cm. |
| Overall length of structure | 48'2" | 14.7 m. |
| Overall depth of structure | 40'2" | 12.2 m. |
| Overall height (above floor) | 27' | 8.25 m. |
| Overall height (above base) | 34' | 10.4 m. |
| Control devices: | | |
| Control rods— | | |
| Location—horizontal entering control face. | | |
| Number of coarse control rods | | 4 |
| Distance from centre | 3'6" | 106 cm. |
| Number of fine control rods | | 1 |
| Distance from centre | 8'6" | 206 cm. |
| Tube material—mild steel. | | |

| Dimensions and Weights | English | Metric |
|---|---|---|
| Diameter of tube (outside) | 2" | 5.08 cm. |
| Wall thickness of tube (max.) | 1/8" | 0.3 cm. |
| Filling—boron carbide powder. | | |
| Density of filling | | 1.5 |
| Length of filling | 17' | 520 cm. |
| Distance of travel | 17'6" | 535 cm. |
| Full-in position | | central |
| Size of hole (vertical diamond). | 2¼" square | 5.7 cm. square. |
| Driving mechanism—fixed rack, moving trolley with D. C. motor, armature energised from rectifier-amplidyne system, 3 dial, magslip control and indicator gear, fast and slow push button operation, singly or ganged, individual manual setting. | | |
| Shut-off Rods— | | |
| Location—vertical, entering top face. | | |
| Total number of rods | | 12 |
| Arrangement—two banks of 6 each. | | |
| Distance from centre (mean) | 5'9" | 175 cm. |
| Tube material—mild steel. | | |
| Tube diameter (outside) | 3⅛" | 7.9 cm. |
| Wall thickness of tube (max.). | 1/8" | 0.3 cm. |
| Filling—Boron carbide powder. | | |
| Density of filling | | 1.5 |
| Length of filling | 6'6" | 198 cm. |
| Distance of travel | 15'6" | 472 cm. |
| Full-in position | | central |
| Size of hole | 4¼" dia | 10.8 cm. |
| Driving mechanism—air operated injector piston, air and hydraulic lifting gear with rope system, self-buffering in hydraulic gear, energy destroying safety device, each bank operating independently. | | |
| Ion Chambers— | | |
| Location—horizontal, entering control face. | | |
| Number of fixed chambers | | 3 |
| Position (below centre line) | 4'10" | 147 cm. |
| Max. entry (to edge of core) | 4'2½" | 128 cm. |
| Normal entry—to edge of reflector. | | |
| Number of movable chambers. | | 3 |
| Position (below centre line) | 7'3" | 221 cm. |
| Max. entry (to edge of core) | 5'5½" | 166 cm. |
| Normal entry—5 different sensitivity settings. | | |
| Number of spare holes | | 3 |
| Size of all holes | 8" square | 20.3cm. sq. |
| Type of chamber—BF₃ filled at 7.8 cm. Hg. Collecting volume 4.7 litres. | | |
| Driving mechanism—Manual adjustment. | | |

| Experimental Facilities | Number |
|---|---|
| Holes right through the pile: | |
| Experimental 3⅛" x 3⅛"—transverse—through side thermal column and core | 12 |
| Experimental 3⅛" x 3⅛"—transverse—around side thermal column and through core | 11 |
| Large animal 14½" x 14½"—transverse—at base of pile | 4 |
| Removable core 25⅜" x 21¾" wide—longitudinal—one at centre, one at edge of core | 2 |
| Holes entering the graphite: | |
| Experimental 3⅛" x 3⅛" x 13'10½"—transverse—from floor level on experimental face | 5 |
| Experimental 3⅛" x 3⅛" x 12'0"—transverse—through side thermal column | 5 |
| Experimental 3⅛" x 3⅛" x 3'7¾"—transverse—through side thermal column | 9 |
| Experimental 3⅛" x 3⅛" x 3'7¼"—transverse—from experimental face to edge of core | 2 |
| Large animal 14½" x 14½" x 3'0"—transverse—from control face to edge of core | 2 |
| Small animal 7¼" x 7¼" x 3'0"—transverse from control face to edge of core | 1 |
| Experimental 4" dia. x 13'3"—vertical—through top thermal column | 16 |
| Experimental 4" dia. x 13'3"—vertical—just outside top thermal column | 6 |
| Sack holes 29" x 65¼" x 29"—vertical—over either edge of cylindrical core | 2 |
| [Last dimension is depth into graphite.] | |
| Holes through shield only: | |
| Periscope 4½" dia. (min.)—vertical—above air header at either end | 6 |
| Fissile dust detector 1½" dia. (min.)—vertical—above air outlet end of each line of channels | 43 |
| Graphite measuring 1½" dia. (min.)—vertical—along centre line of pile | 6 |

We claim:

A nuclear reactor comprising a mass of graphite having a plurality of vertical rows of horizontal channels therethrough, uranium cartridges in said channels, a shielding structure enclosing said mass, means for passing cooling air into said shielding structure and through said channels, means for controlling the reactor and an apparatus for detecting the presence of active dust particles in the cooling air issuing from said channels within the shield comprising a drum rotatably mounted above a vertical hole in the shielding structure above each vertical row of channels, a length of dust absorbent cord attached to said drum and depending through said hole to hang in the path of the cooling air issuing from the channels of said row, a two-speed electric motor for driving the drum to haul in the cord, a detector mounted adjacent the drum for detecting variations in the level of radioactivity in the cord along its length as the cord is hauled past said detector, cam operated switch mechanism driven by said drum for switching the motor from a high speed to a low speed when that part of the cord which was opposite the uppermost channel of said row approaches the detector and for stopping said motor when that part of the cord which was opposite the lowermost channel of said row has passed the detector and means for recording said variation in activity over the period of haul at the lower speed.

References Cited in the file of this patent

UNITED STATES PATENTS 2,708,656  Fermi et al. _____ May 17, 1955

OTHER REFERENCES

Radioactive Transformations by E. Rutherford, pub. by Charles Scribner's Sons, N. Y. (1906), pp. 198, 199.

Petroleum, pub. by Leonard Hill, Ltd., London (Jan. 1948) pp. 2–6.

Sourcebook of Atomic Energy by Samuel Glasstone, pub. by D. Van Nostrand Co., N. Y. (1950), pp. 514, 515.

Atomics (Great Britain) Feb. 1951, pp. 51–56 (article entitled Gleep.)

Atomics (Great Britain) June 1951, pp. 176–180 (an article entitled Bepo.)